United States Patent [19]

Takei

[11] 4,399,974
[45] Aug. 23, 1983

[54] ENGINE MOUNT

[75] Inventor: Hirofumi Takei, Yokosuka, Japan

[73] Assignee: Nissan Motor Company, Limited, Yokohama, Japan

[21] Appl. No.: 329,570

[22] Filed: Dec. 10, 1981

[30] Foreign Application Priority Data

Jan. 7, 1981 [JP] Japan ............................... 56-1139[U]

[51] Int. Cl.³ ............................................ F16M 13/00
[52] U.S. Cl. .................................... 248/605; 248/631; 248/659
[58] Field of Search ............... 248/575, 636, 638, 659, 248/605, 621, 631, 575, 562; 180/902, 312, 291; 267/35, 152

[56] References Cited

U.S. PATENT DOCUMENTS 2,697,578 12/1954 Whittam .

FOREIGN PATENT DOCUMENTS

| 5730 | 12/1979 | European Pat. Off. ............ 180/291 |
| 6819 | 1/1980 | European Pat. Off. ............ 180/312 |
| 44545 | 1/1982 | European Pat. Off. ............ 180/291 |
| 661895 | 6/1938 | Fed. Rep. of Germany . |
| 1086139 | 7/1960 | Fed. Rep. of Germany . |
| 2309276 | 8/1974 | Fed. Rep. of Germany . |
| 2514295 | 4/1975 | Fed. Rep. of Germany ........ 267/35 |
| 2616258 | 11/1977 | Fed. Rep. of Germany ........ 267/35 |
| 913949 | 12/1962 | United Kingdom . |

Primary Examiner—J. Franklin Foss
Attorney, Agent, or Firm—Schwartz, Jeffery, Schwaab, Mack, Blumenthal & Koch

[57] ABSTRACT

Between two elastic resilient blocks are disposed in parallel first and second vibration absorbers. The first absorber is an air-filled annular tube which absorbs a high-frequency small-altitude vibration which is transmitted from the engine to the vehicle body, while the second absorber is an elastic resilient block which absorbs a low-frequency large-altitude vibration which is transmitted from the vehicle body to the engine.

12 Claims, 3 Drawing Figures

ENGINE MOUNT

BACKGROUND OF THE INVENTION

1. Field of the Invention

The present invention relates to an engine mount through which an engine is mounted to the vehicle body.

2. Description of the Prior Art

Usually, engines are mounted to the vehicle through rubber insulators which are constructed and arranged to absorb the vibration transmission from the engine to the vehicle body or vice versa. Thus, in general, two characterstics are required in the engine mount for achieving better engine mounting. One is a characteristic (which will be referred to as a high-frquency vibration absorbing characteristic) to absorb the high-frequency small-amplitude vibration (about about 30 Hz) which, originating from the high speed rotation of the engine, is transmitted from the engine to the vehicle body, the other is a characteristic (which will be referred to as a low-frequency vibration absorbing characteristic) to absorb the low frequency large-amplitude vibration (about 5 Hz to about 30 Hz) which, originating from impacts of the road wheels against the foreign things on the road, is transmitted from the vehicle body to the engine. Although, many types of engine mounts have been hitherto proposed, some of them fail to exhibit both the above-mentioned two characteristics to the desirable levels.

SUMMARY OF THE INVENTION

It is therefore an object of the present invention to provide an improved engine mount which possesses both the two characterstics to the desirable levels.

According to the present invention, there is provided an engine mount for mounting an engine on a vehicle body. The engine mount comprises first and second elastic resilient blocks arranged to leave therebetween a certain clearance, the first block being connected to the engine through bracket means and the second block being connected to the vehicle body through bracket means; a first vibration absorber disposed in the clearance to absorb a high-frequency small-amplitude vibration which, originating from the operation of the engine, is transmitted from the engine to the vehicle body, and a second vibration abosrber disposed in the clearance in parallel with the first vibration absorber to absorb a low-frequency large-amplitude vibration which, originating from impacts of the road wheels against the foreign things on the road, is transmitted from the vehicle body to the engine.

BRIEF DESCRIPTION OF THE DRAWINGS

Other objects and advantages of the present invention will become apparent from the following description when taken in conjunction with the accompanying drawings, in which.

DESCRIPTION OF THE INVENTION

Prior to describing the invention, one of the conventional engine mounts will be explained with reference to FIGS. 1 and 2 in order to clarify the invention.

Figure 1:
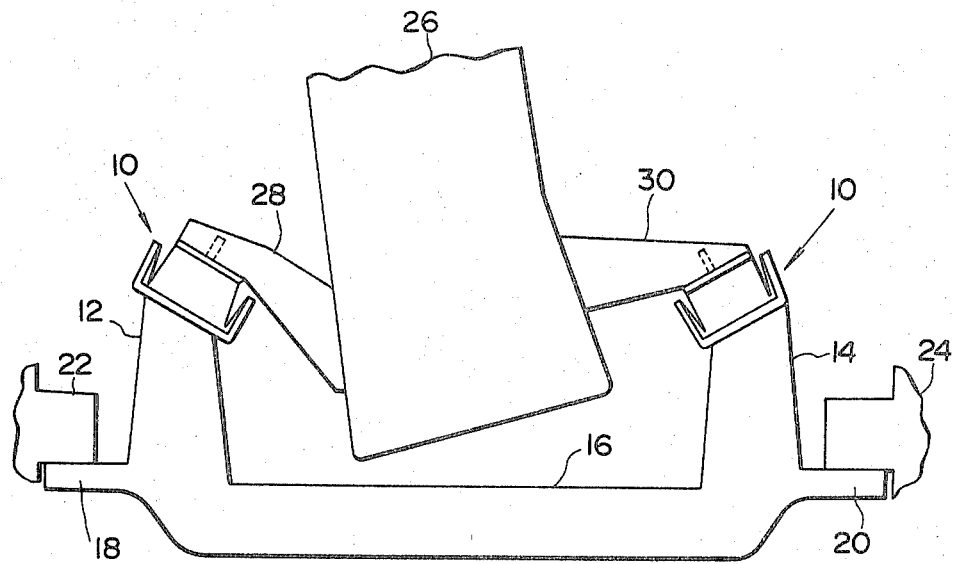
FIG. 1 is a front, but fragmentary, view of an engine mounting construction in which conventional engine mounts are used.

In those drawings, particularly FIG. 1, there is shown an engine mounting construction in which the conventional engine mounts 10 are used. The engine mounting construction hereinshown comprises two spaced supporting brackets 12 and 14 which extend upwardly from a cross member 16 of the vehicle body. The cross member 16 has at its both ends respective steps 18 and 20 to which side members 22 and 24 of the vehicle body are secured. An engine 26 is provided at both its sides with mounting brackets 28 and 30 of which leading ends are respectively supported on the supporting brackets 12 and 14 through the engine mounts 10. Although not shown in the drawing, another engine mount is employed, which is located at the rear of the transmission, so that the engine-transmission combination is supported at three points.

Figure 2:
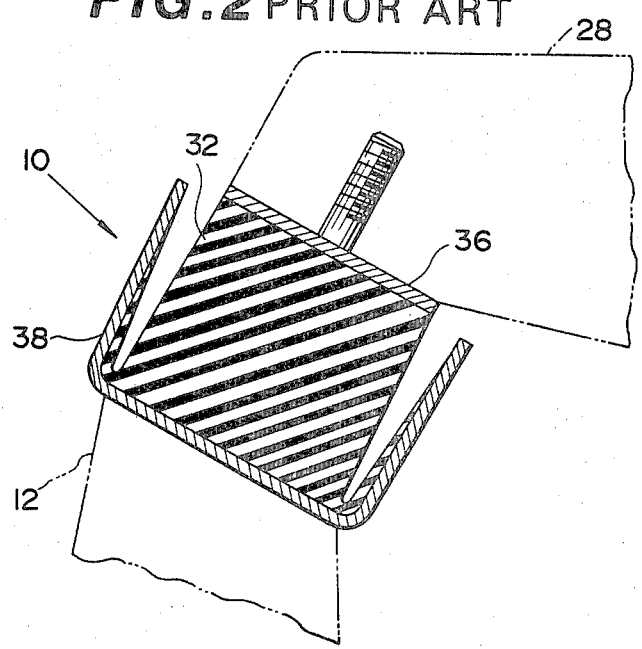
FIG. 2 is an enlarged sectional view of the conventional engine mount.

As is well shown in FIG. 2, the conventional engine mount 10 comprises an insulating rubber block 32 to which upper and lower retaining plates 36 and 38 are secured. Upon assemblage, the upper retaining plate 36 is bolted to the mounting bracket 28 (or 30) and the lower retaining plate 38 is secured to the supporting bracket 12 (or 14), so that the mounting of the engine 26 on the vehicle body is made through the insulating rubber block 32.

However, it has been revealed that the engine mount 10 of the above-mentioned type fails to exhibit the afore-mentioned two characteristics to the desirable levels. In fact, when improvement of the high-frequency vibration abosrbing characteristic is required, the insulating rubber block 32 has to be made by an elastic block which has a lower spring constant and lower damping coefficient. However, using such block as a material of the insulator 32 induces lowering of the low-frequency vibration absorbing characteristic.

In practical use, the high-frequency vibration absorbing characteristic is sacrificed for improving the other characteristic. However, in this case, there sometimes arises a problem that noisy echoic sounds are generated in the vehicle cabin, originating from the high speed rotation of the engine.

To eliminate the above-mentioned problem is an essential object of the present invention. In the following, the present invention will be described in detail with reference to FIG. 3.

Figure 3:
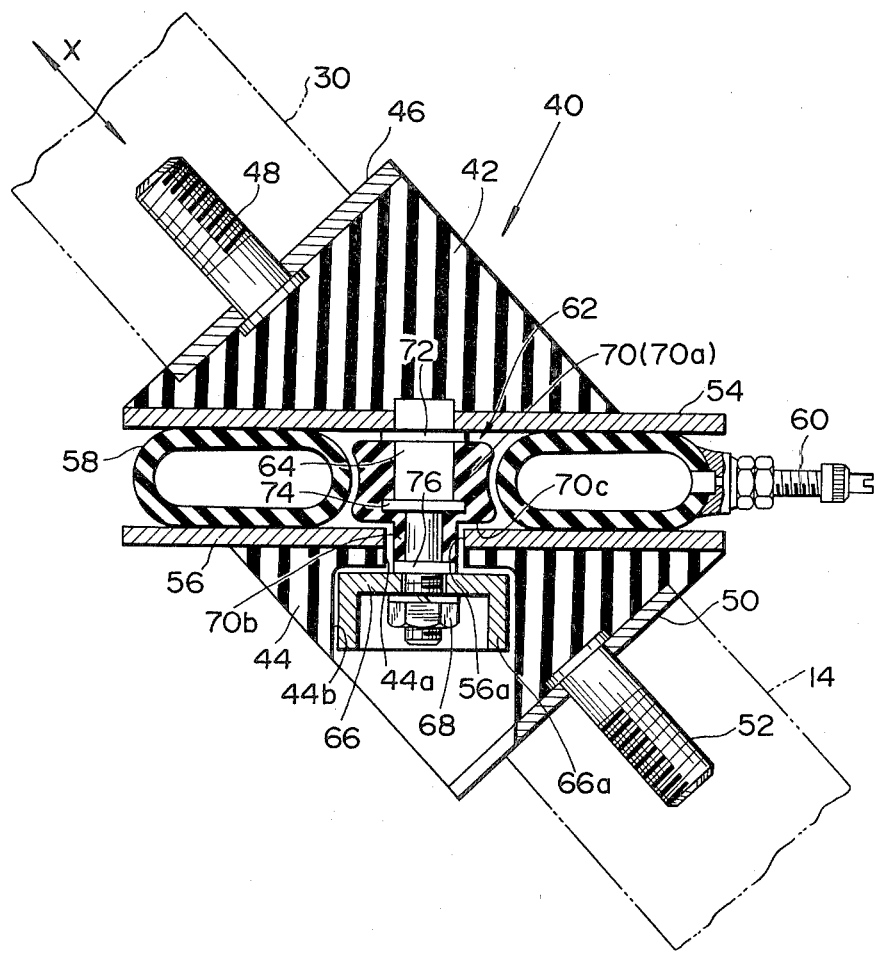
FIG. 3 is a sectional view of an engine mount according to the present invention.

Referring to FIG. 3, there is shown an engine mount 40 of the present invention. Although not shown, the engine mount 40 is adapted to be set at a position corresponding to the position where the conventional engine mount 10 (see FIG. 1) is arranged.

The engine mount 40 of the invention comprises a pair of elastic resilient blocks 42 and 44, such as insulating rubber blocks or the like, each being formed into a right-angled triangular prism. They are arranged so that the respective largest sides thereof face each other leaving therebetween a certain clearance, as shown. To one side of the block 42 is secured a retaining plate 46 from which a bolt 48 extends outwardly. Vulcanization technique may be employed for securing the retainer 46 to the block 42. Similar to the above, another retaining plate 50 is secured to one side of the other block 44. Another bolt 52 extends outwardly from the retaining plate 50. It is to be noted that the bolts 48 and 50 are aligned on a common axis. Two retaining plates 54 and 56 are respectively secured, via vulcanization technique, to the largest sides of the rubber blocks 42 and 44.

An annular tube 58 constructed of elastic material, such as flexible rubber, is disposed in the space between the retaining plates 54 and 56 in a manner to lie therein. The tube 58 is filled with a pressurized air to cause the two blocks 42 and 44 to be biased away in the opposite directions. For this, the tube 58 is equipped with an air inlet valve 60 from which air is fed into the tube 58. If desired, the tube 58 may be filled with other compressible fluid, such as insert gases.

Designated by numeral 62 is a blocking device which is designed to connect the two rubber blocks 42 and 44 by interposing therebetween another elastic block when the block 44 moves toward the other block 42 by a predetermined distance. The blocking device 62 comprises a metal shaft 64 which is secured at its one end to the retaining plate 54 and extends therefrom toward the rubber block 44, passing through the central space of the annular tube 58, as shown. The leading end portion of the shaft 64 passes through a circular opening 56a formed in the retaining plate 56 and through a circular opening 44a formed in the block 44, and projects into a cylindrical bore 44b formed in the block 44, the bore 44b being merged with the opening 44a. As shown, the head portion of the shaft 64 is threaded and the sectional area of the bore 44b is greater than that of the opening 44a which is substantially equal to that of the opening 56a of the retaining plate 56. Axially movably received in the bore 44b of the block 44 is a circular metal member 66 having a cylindrical side wall 66a, which is coaxially secured to the shaft 64 by means of a nut 68 screwed to the threaded head portion of the shaft 64. Thus, the shaft 64 and the circular member 66 are movable together as a unit.

A generally cylindrical rubber block 70 is coaxially disposed about the major portion of the shaft 64 between two spaced circular flanges 72 and 76 formed on the shaft. For assuring the connection of the block 70 to the shaft 64, another circular flange 74 is formed on the shaft 64, which is embedded in the block 70. As shown, the block 70 comprises a larger diameter portion 70a which is spacedly received in the central space of the annular tube 58 and a smaller diameter portion 70b which is spacedly received in the circular openings 56a and 44a of the retaining plate 56 and the block 44. It is to be noted that the sum of the axial length of the smaller diameter portion 70b of the block 70 and the thickness of the flange 76 is greater than the sum of the axial lengthes of the openings 56a and 44a. Thus, it will be readily understood that when no external force is applied to the two blocks 42 and 44 to bring them close to each other, the two retaining plates 54 and 56 are held in the farmost positions, having the bottom of the bore 44b in contact with the back of the annular member 66. The arrow X in the drawing indicates the major component of the inertial of the vibrational movement of the engine. The engine mount 40 is disposed between the mounting bracket 30 and the supporting bracket 14 in such a manner that the bolts 48 and 52 lie coaxially on the main component of the inertia of the engine.

In the following, function of the engine mount 40 will be described.

Under operation of the engine, the high-frequency small-amplitude vibration, which originates from the rotation of the engine, is ransmitted to the air-filled annular tube 58 through the rubber block 42. At the tube 58, the vibration is absorbed by compressing the pressurized air in the tube 58. Thus, the transmission of vibration to the vehicle body is minimized, so that the noises, such as the echoic sounds, are not produced in the vehicle cabin.

On the other hand, under cruising of the vehicle, the low-frequency large-amplitude vibration, which originates from the impacts of foreign things on the road against the road wheels, is transmitted to the lower rubber block 44, thereby making a possibility of bringing the retaining plate 56 into contact with the shoulder portion 70c of the rubber block 70 of the blocking device 62. Thus, the vibration at the block 44 is transmitted to the upper rubber block 42 through the blocking block 70 during the time when the retaining plate 56 is in contact with the shoulder portion 70c of the block 70. Thus, the low-frequency large-amplitude vibration from the vehicle body is abosrbed steadily by the blocks 44, 70 and 42, by elastically deforming or compressing the same. With this, the undesired "car-shake" phenomenon does not occur. In this condition, the engine mount 40 has a higher spring constant thereby improving the low-frequency vibration absorbing characteristic. By the provision of the annular member 66 which is contactable with the bottom of the bore 44b, the excessive movement of the block 44 in the direction away from the block 42 is suppressed.

It is to be noted that because the engine mount 40 is so arranged that the axes of the connecting bolts 48 and 52 are aligned coaxially with the main component of inertia of the engine movement, the engine mount 40 can exhibit high resiliency against a force which is applied thereto in a direction normal to the axes of the bolts 48 and 52. Thus, consolidation of the rocking motion and the rolling motion of the engine is prevented.

As is understood from the foregoing description, the engine mount according to the present invention possesses both the high-frequency vibration absorbing characteristic and the low-frequency vibration absorbing characteristic, to the desered high levels.

Further, according to the present invention, the high-frequency vibration absorbing characteristic can be easily adjusted by changing the pressure of the fluid (or air) in the annular tube 58.

What is claimed is:

1. An engine mount for mounting an engine on a vehicle body, comprising:
   (1) first and second elastic resilient blocks arranged to leave therebetween a certain clearance;
   (2) first bracket means connecting said block to said engine, and second bracket means connecting said second block to said vehicle body;
   (3) a first vibration absorber disposed in said clearance to absorb a high-frequency small-amplitude vibration which, originating from the operation of the engine, is transmitted from the engine to the vehicle body;
   (4) a second vibration absorber disposed in said clearance in parallel with said first vibration absorber to absorb a low-frequency large-amplitude vibration which, originating from impacts of the road wheels of the vehicle, is transmitted from the vehicle body to the engine;
   (5) said first vibration absorber comprising an annular tube of an elastic mateial filled with pressurized air;
   (6) said second vibration absorber comprising:
      (a) a third elastic resilient block which assumes a condition disengaged from said second block when said tube is expanded to a certain degree; and
(b) stopper means which suppresses excessive movement of said second block in the direction away from said first block;
(7) said stopper means having
(a) a bore formed in said second block, said bore being in communication with said clearance through an opening fromed in said second block, the sectional area of said bore being greater than that of said opening;
(b) a shaft about which said third block is coaxially mounted, said shaft extending from said first block toward said second block through the central opening of said annular tube and projecting at its head portion into said bore of said second block through said opening of the same; and
(c) a stopping member spacedly received in said bore of the second block and secured to said head portion of said shaft to be axially movable therewith in said bore, said stopping member having a size larger than said opening of said second block;
(8) said third block further comprising a larger diameter portion spacedly received in the central opening of said annular tube and a smaller diameter portion spacedly received in said opening of said second block; and
(9) said shaft being formed with two spaced circular flanges between which said third block is disposed.

2. An engine mount as claimed in claim 1, in which said shaft is formed with another circular flange which is embedded in said third block.

3. An engine mount as claimed in claim 1, in which said head portion of said shaft is threaded so that the connection of said stopping member to said shaft is made by screwing a nut to the threaded head portion of the shaft.

4. An engine mount as claimed in claim 1, in which mutually facing surfaces of said first and second blocks by which surfaces said clearance is defined are lined with retaining plates.

5. An engine mount as recited in claim 1 in which said annular tube is equipped with an air inlet valve through which air is fed into said tube.

6. An engine mount for mounting an engine on a vehicle body, comprising:
(1) first and second elastic resilient blocks arranged to leave therebetween a certain clearance;
(2) first bracket means connecting said block to said engine, and second bracket means connecting said second block to said vehicle body;
(3) a bag disposed in said clearance and filled with a compressible fluid to expand to such a degree that the bag contacts with both said first and second elastic resilient blocks;
(4) a third elastic resilient block supported by said first block and disposed within said clearance, said third block disengaging from said second block when said bag expands to a certain degree, said bag biasing the first and second blocks away from one another; and
(5) stopper means for suppressing an excessive displacement of said first and second blocks in the direction away from one another;
(6) said stopper means comprising:
(a) a bore formed in said second block, said bore being connected to said clearance through a reduced opening which is smaller in size than said bore;
(b) a shaft about which said third block is coaxially mounted, said shaft extending from said first block to said bore through said reduced opening; and
(c) a stopper member spacedly received in said bore and fixed to said shaft, said stopper member being larger in size than said reduced opening.

7. An engine mount as recited in claim 6 in which said bag is an annular tube filled with pressurized air, said annular tube lying in said clearance.

8. An engine mount as recited in claim 6 in which said annular tube is equipped with an air inlet valve through which air is fed into said tube.

9. An engine mount as recited in claim 6 in which said shaft is formed with two spaced circular flanges between which said third block is disposed.

10. An engine mount as recited in claim 9 in which said shaft is formed with another circular flange which is embedded in said third block.

11. An engine mount as recited in claim 6 in which said head portion of said shaft is threaded so that the connection of said stopping member to said shaft is made by screwing a nut to the threaded head portion of the shaft.

12. An engine mount as recited in claim 6 in which mutually facing surfaces of said first and second blocks by which surfaces said clearance is defined are lined with retaining plates.

* * * * *